(12) United States Patent
Anderson et al.

(10) Patent No.: US 9,067,736 B2
(45) Date of Patent: Jun. 30, 2015

(54) VARIABLE PITCH SYSTEM, APPARATUS AND METHOD

(75) Inventors: Paul L. Anderson, Alexandria, MN (US); Irvan Leo Pazdernik, Alexandria, MN (US)

(73) Assignee: Douglas Machine Inc., Alexandria, MN (US)

( * ) Notice: Subject to any disclaimer, the term of this patent is extended or adjusted under 35 U.S.C. 154(b) by 0 days.

(21) Appl. No.: 14/114,590

(22) PCT Filed: Apr. 27, 2012

(86) PCT No.: PCT/US2012/035489
§ 371 (c)(1),
(2), (4) Date: Jan. 29, 2014

(87) PCT Pub. No.: WO2012/149346
PCT Pub. Date: Nov. 1, 2012

(65) Prior Publication Data
US 2014/0138215 A1 May 22, 2014

(51) Int. Cl.
*B65G 47/28* (2006.01)
*B65G 15/58* (2006.01)
*B65G 17/42* (2006.01)
*B65G 47/08* (2006.01)

(52) U.S. Cl.
CPC ............... *B65G 15/58* (2013.01); *B65G 17/42* (2013.01); *B65G 47/084* (2013.01)

(58) Field of Classification Search
CPC .... B65G 47/36; B65G 47/26; B65G 2201/02; B65G 47/265
USPC .......................... 198/465.1, 459.1, 459.8, 795
See application file for complete search history.

(56) References Cited

U.S. PATENT DOCUMENTS

| 2,781,123 | A | * | 2/1957 | Gueffroy | .................... 198/459.1 |
| 2,816,647 | A | | 12/1957 | Ruth | |
| 4,225,031 | A | | 9/1980 | Frisbie et al. | |
| 5,092,451 | A | | 3/1992 | Jones et al. | |
| 5,359,834 | A | * | 11/1994 | Holdensgaard et al. | ... 198/465.1 |
| 5,546,734 | A | * | 8/1996 | Moncrief et al. | ............. 198/433 |
| 6,698,574 | B2 | * | 3/2004 | Frommenwiler et al. | . 198/465.1 |
| 7,658,275 | B2 | * | 2/2010 | Hayashi | ..................... 198/459.8 |
| 2001/0019006 | A1 | * | 9/2001 | Stauber | ....................... 198/459.8 |

(Continued)

OTHER PUBLICATIONS

Copenheaver, Blaine R., PCT International Search Report and Written Opinion of the International Searching Authority, PCT Application No. PCT/US12/35489, Jul. 10, 2012.

(Continued)

*Primary Examiner* — James R Bidwell
(74) *Attorney, Agent, or Firm* — Nawrocki, Rooney & Sivertson, P.A.

(57) ABSTRACT

A system for spacing conveyed articles is generally provided. The system advantageously includes an apparatus for conveying articles characterized by a driven loop element and a plurality of article selectors, each article selector adapted for select reversible engagement with the driven loop element. A queuing station, characterized by an ingress and egress portions wherein article selectors are retained for select dispensing, is likewise provided and includes a first actuator to facilitate disengagement of article selectors from the driven loop element, and a second actuator to facilitate engagement of article selectors with the driven loop element. An assembly for selectively dispensing article selectors from the queuing station is further provided.

16 Claims, 12 Drawing Sheets

(56) References Cited

U.S. PATENT DOCUMENTS

2005/0109579 A1* 5/2005 Griffin et al. .............. 198/465.1
2006/0266620 A1 11/2006 Hillmantel et al.
2014/0159527 A1* 6/2014 Kawashima et al. ......... 310/148

OTHER PUBLICATIONS

Moon, Kihwan, PCT International Preliminary Report on Patentability, PCT Application No. PCT/US12/35489, Nov. 7, 2013.

* cited by examiner

VARIABLE PITCH SYSTEM, APPARATUS AND METHOD

This is an international application filed under 35 USC §363 claiming priority under 35 USC §120 of/to U.S. patent application Ser. No. 61/480,795 filed Apr. 29, 2011 and entitled VARIABLE ARTICLE PITCH, the disclosure of which is hereby incorporated by reference in its entirety.

TECHNICAL FIELD

The present invention generally but not exclusively relates to packaging lines, more particularly, to continuous motion packaging, and more particularly still, to systems, apparatus, mechanisms, methods, etc. for the formation of article groups of a predetermined number and/or configuration.

BACKGROUND OF THE INVENTION

Packaging lines characterized by a variety of processing/handling steps are well known. Commonly, cartoning apparatus are provided which are designed to package articles such as bottles or cans into a unitary container such as a paper board tray, carton or case (see e.g., and without limitation, U.S. Pat. No. 5,546,734 (Moncrief et al.)). In advance of cartoning or the like, articles are selectively grouped from a supply of articles in some manner so as to correspond with/conform to the approximate container dimensions, e.g., article arrays may be selectively formed, such as a 2×6, 4×12, etc. and thereafter, the article group is presented for packaging, and packaged.

Packaging lines demand flexibility, speed, accuracy, and efficiency during production runs. Long changeover time, excessive change parts, large operational footprints, and damaged product are undesirable in the production environment because the operational objectives of flexibility, speed, accuracy, and efficiency cannot be met. As such, minimization and/or elimination of such inefficiencies have been sought, and continue to be the focus of persons skilled in the art.

A packaging machine or process line demanding a large size range or pitch requires many components and servo motors to control products or articles/materials as they are metered and loaded into cartons, cases, buckets, lugs, or some other form of loading mechanism or material. This results in increased manufacturing and selling costs. Manufacturers also find it difficult to control product surge, resulting in product damage due to the mechanisms, such as pins, used to hold products back while other products are metered and loaded. The pins, which literally stop the oncoming product, are know to cause small "dents" in the product.

Product changeovers require operators to physically remove an average of 15 to 30 article selectors, i.e., devices that separate products during the metering and loading process, e.g., selectors "bars." This results in extensive changeover times, which reduce production line operating efficiencies due to changeover downtime and startup thereafter.

In light of the foregoing, it remains especially advantageous to provide an "infinite" pitch adjustability, more particularly, to provide an on-the-fly infinite pitch adjustability through selection of a "recipe" from recipes of programmable pitches. Such "solution" eliminates extensive mechanical/operator changeover when adjusting for different pitches; offers smaller/reduced operational floor plans; lowers manufacturing and selling costs due to fewer parts and simpler manufacturing processes; offers higher operating speeds; and, eliminates damaged products due to structure(s) of the infinite pitch adjustability mechanism "moving" with the product throughout the entire product metering and loading process.

SUMMARY OF THE INVENTION

A system for spacing conveyed articles is generally provided. The system advantageously includes an apparatus for conveying articles characterized by a driven loop element and a plurality of article selectors, each article selector adapted for select reversible engagement with the driven loop element. A queuing station, characterized by an ingress and egress portions wherein article selectors are retained for select dispensing, is likewise provided and includes a first actuator to facilitate disengagement of article selectors from the driven loop element, and a second actuator to facilitate engagement of article selectors with the driven loop element. An assembly for selectively dispensing article selectors from the queuing station is further provided.

In connection to the reversible engagement of the article selectors relative to the article conveyor, mechanical, electro-mechanical and magnetic engagement is contemplated, however, alternate means of reversible engagement may be advantageous or suitable. Notionally, emphasis is on the automatic or automated nature of the reversible engagement.

In connection to the assembly for selectively dispensing article selectors, it advantageously is characterized by a metering device and an article selector conveyor. The metering device, which may take a variety of forms, selectively passes article selectors to the article selector conveyor, which likewise may take a variety of forms, in furtherance of dispensing same. More particularly and advantageously, the dispensing function is intended to be regulated and/or controlled such that article selectors are to be methodically united with/to an article conveyor or portion thereof. For example, control of the timing associated with a union of successive/consecutive article selectors, and control, regulation and/or synching of the metered egress/dispensing velocity and/or acceleration in relation to the velocity/acceleration of the conveyor of the article conveyor are noteworthy features.

Finally, a method of spacing conveyed articles is likewise contemplated. A supply of article selectors for reversible engagement with a driven loop element of an article conveying apparatus, in furtherance of selectively establishing a spacing for conveyed articles delimited by consecutive article selectors, is provided. Article engaging elements are selectively dispensed from the supply of article engaging elements for automated self engagement with the driven loop element of the article conveyance apparatus. Selectively dispensed article engaging elements are returned to the supply of article selectors upon automated self disengagement of an article selector from the driven loop element of the article conveyance apparatus. More specific features and advantages obtained in view of those features will become apparent with reference to the drawing figures and DETAILED DESCRIPTION OF THE INVENTION.

BRIEF DESCRIPTION OF THE DRAWINGS & DEPICTIONS THEREOF

FIG. 1 generally depicts an article processing line wherein layout/metering operations are conducted in advance of packaging;

DETAILED DESCRIPTION OF THE INVENTION

Figure 1:
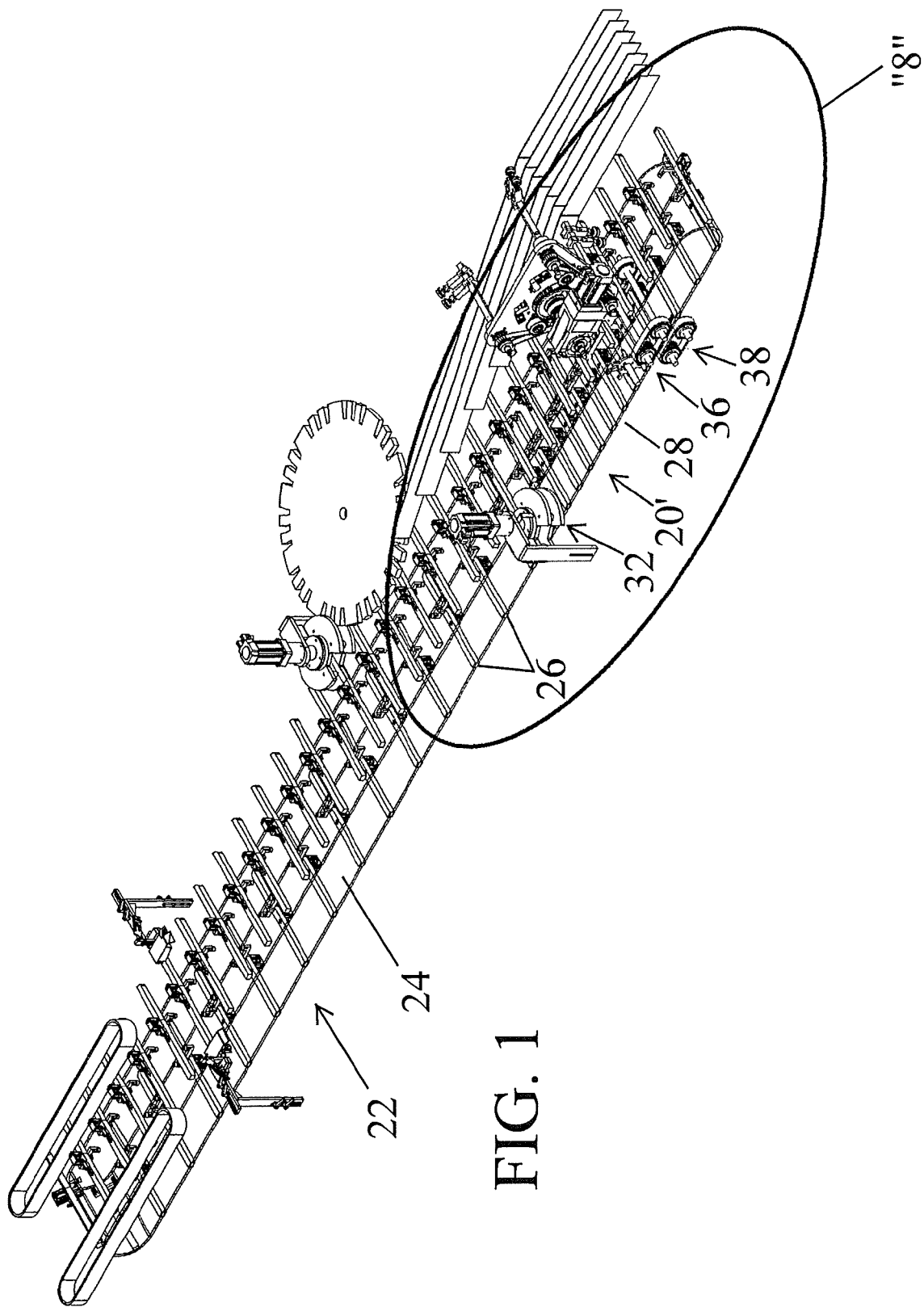
Figure 7:
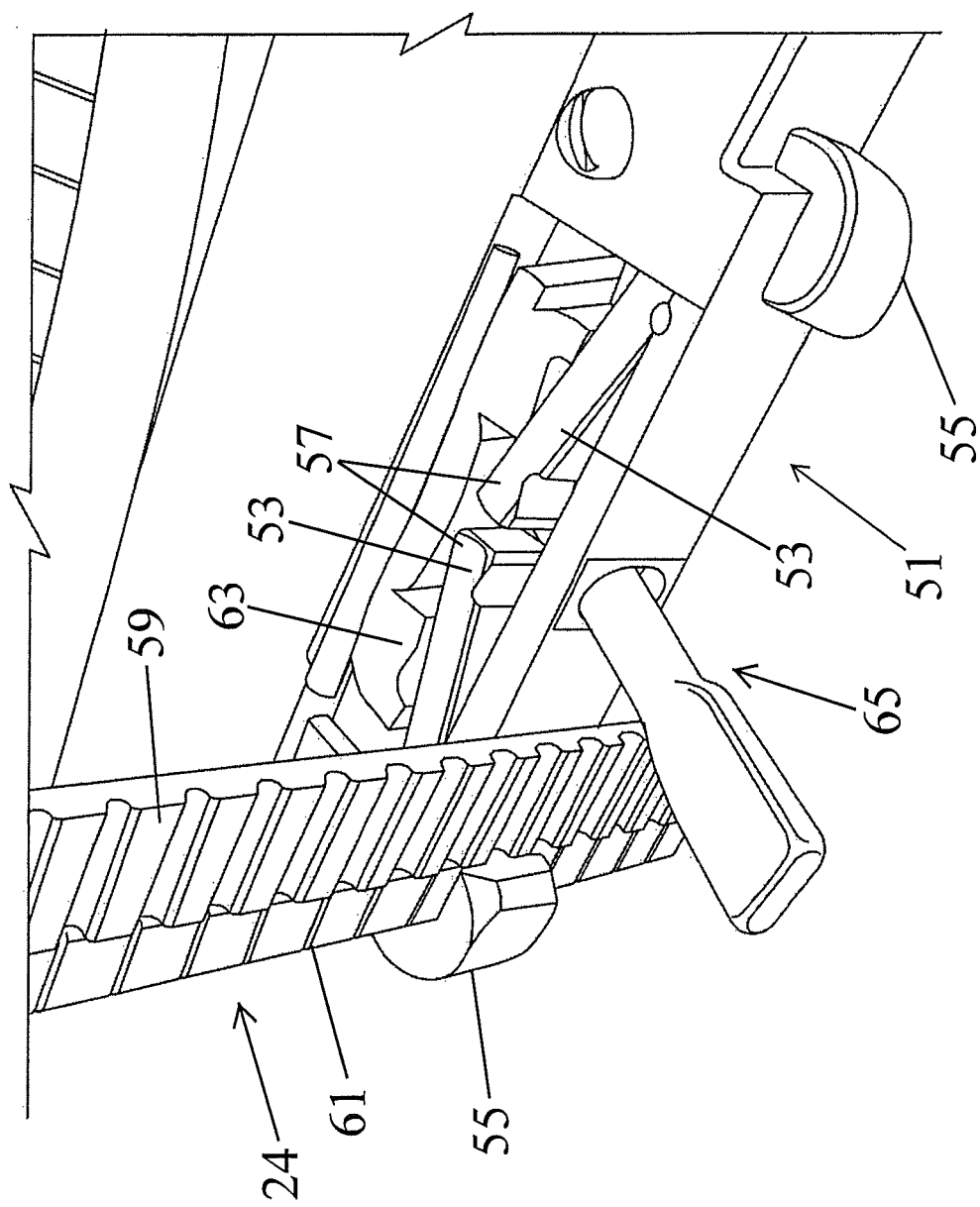
FIG. 7 depicts an interface assembly or system for an article selector so as to unite the article selector with an article conveyor.
Figure 8:
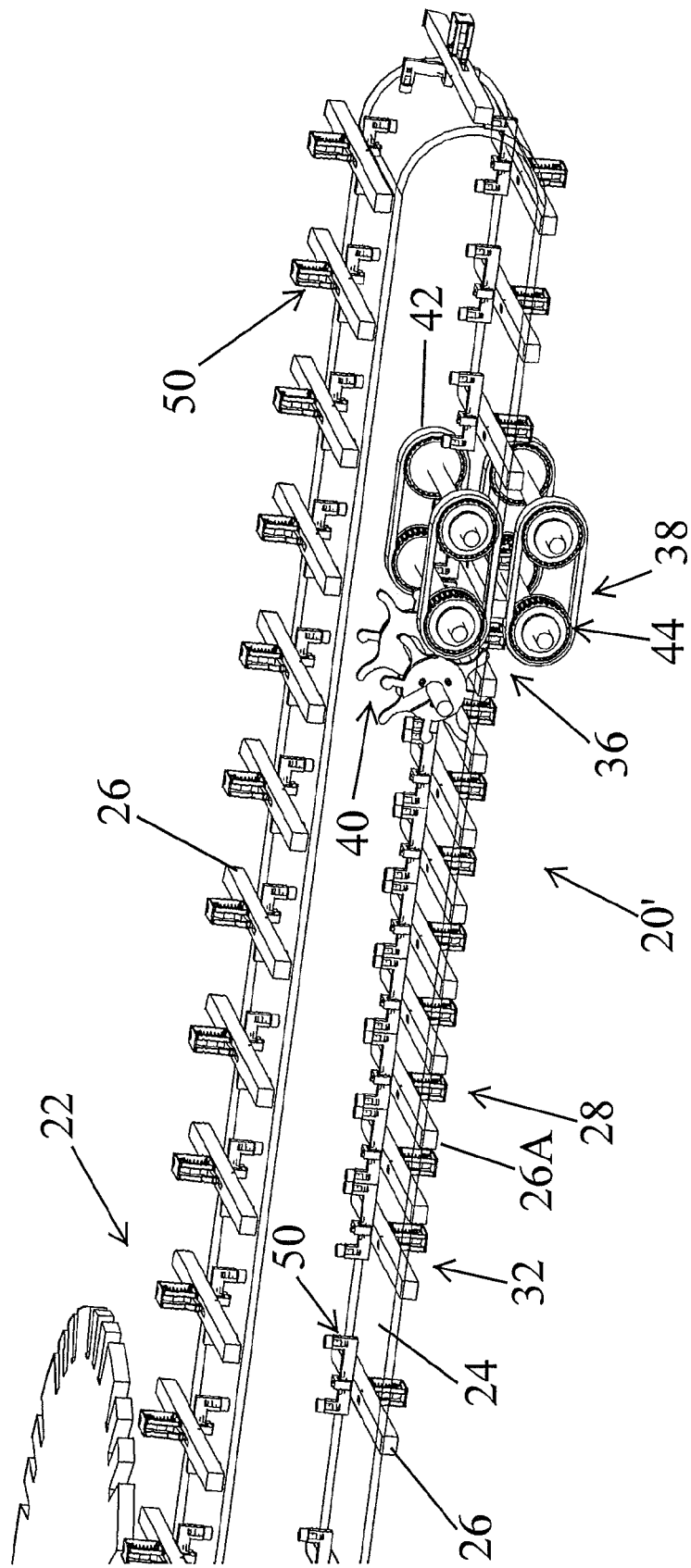
FIG. 8 depicts area "8" of the processing line of FIG. 1.
Figure 10:
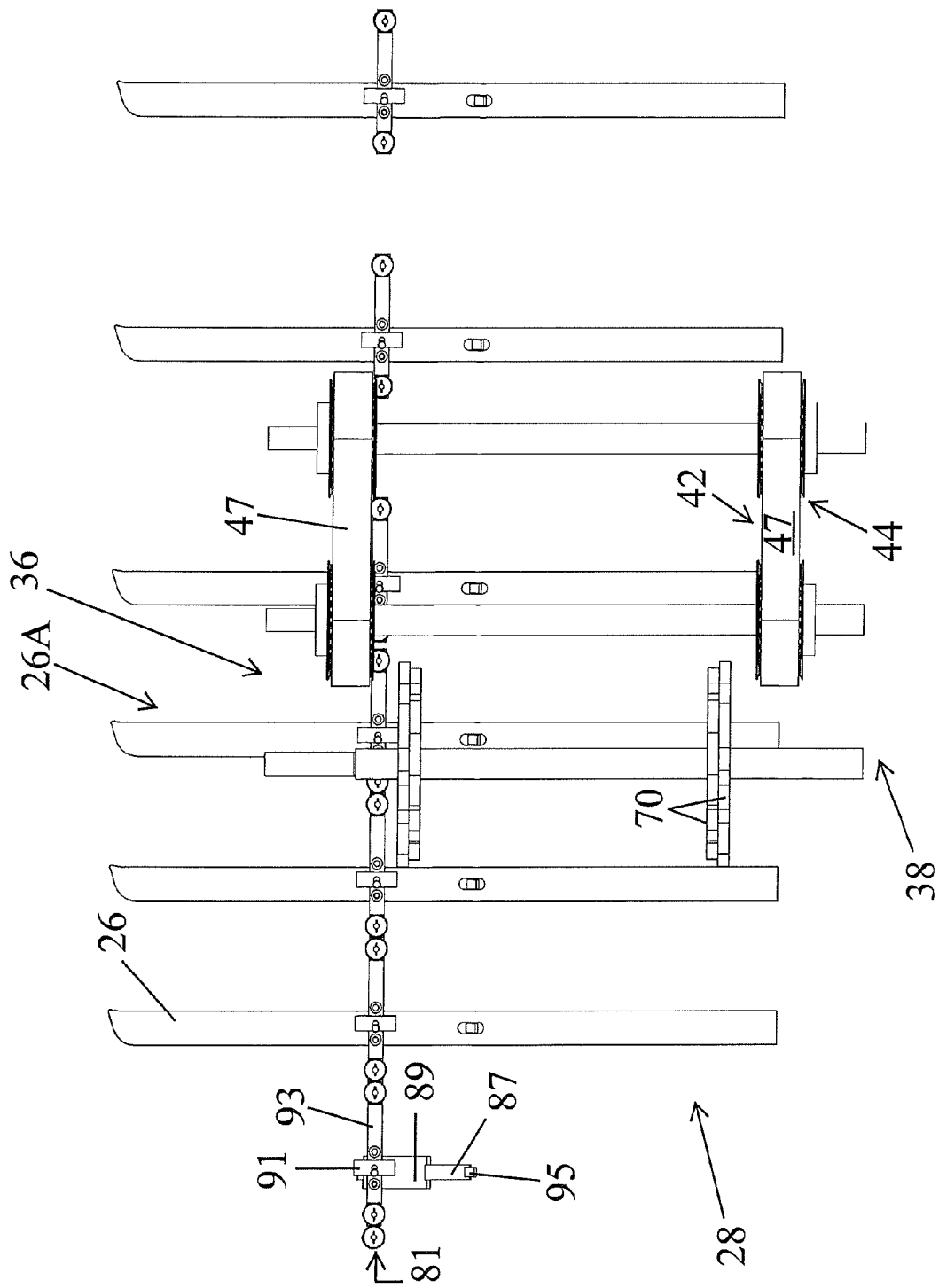
FIG. 10 depicts the queuing station of FIG. 9 as viewed from above.
Figure 11:
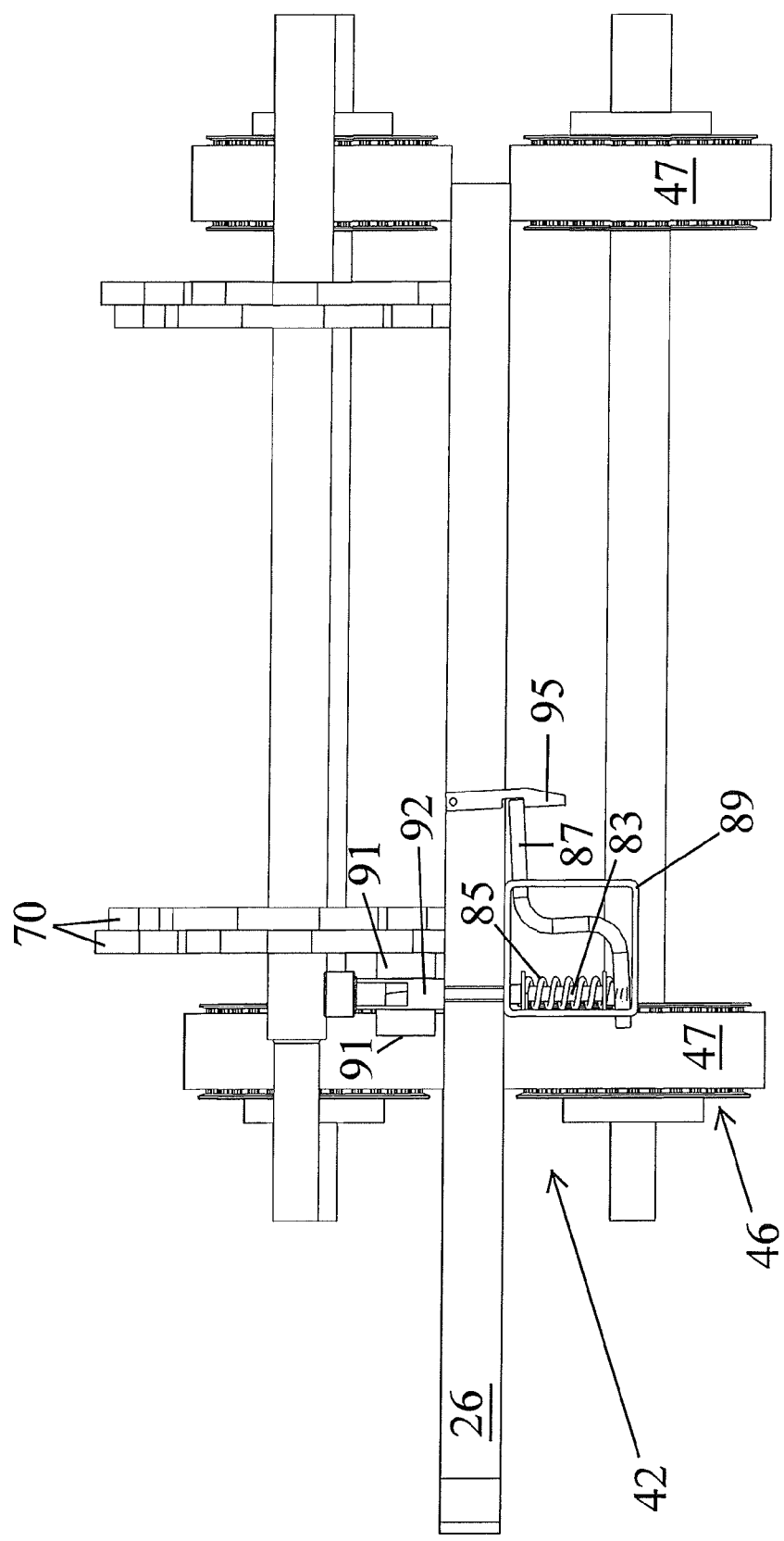
FIG. 11 depicts the queuing station of FIG. 9 in elevation view from an "upstream" vantage point; and, FIG. 12 depicts an article selector of the queuing station of FIG. 9, more particularly, an article selector characterized by an interface assembly or system.
Figure 12:
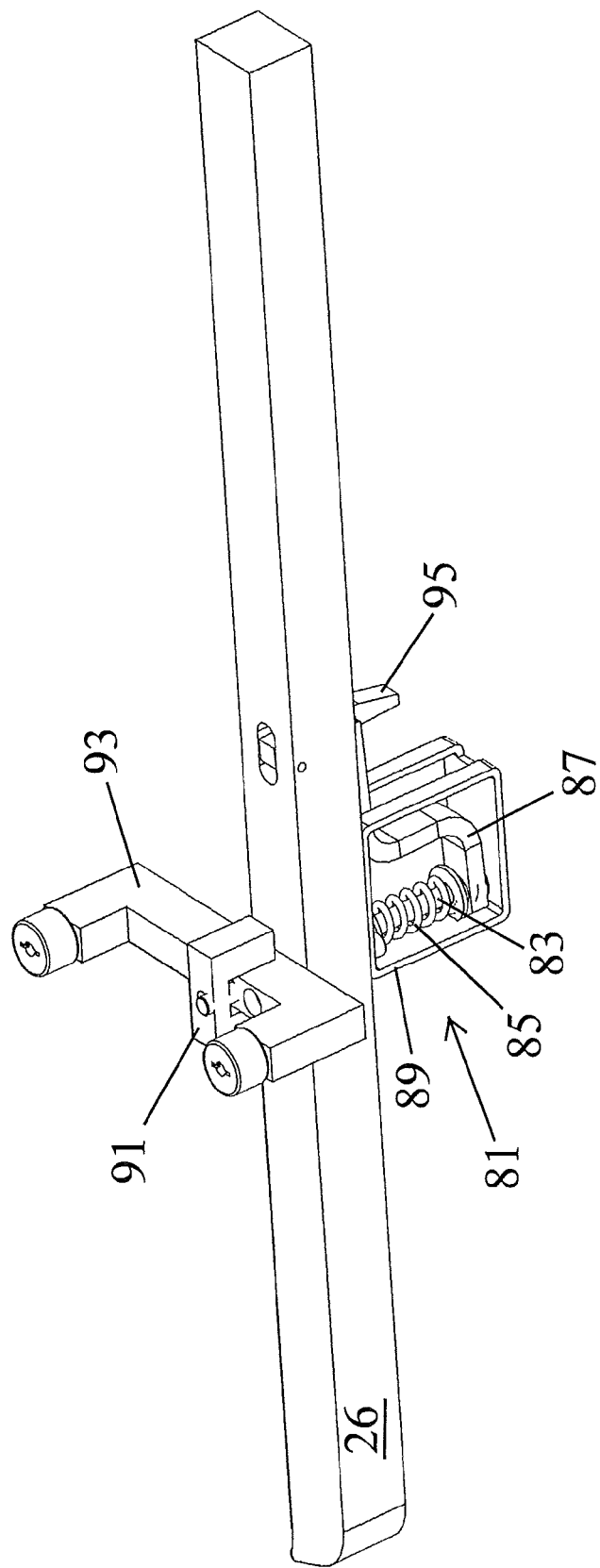

Preferred, non-limiting structures are generally presented throughout the figures of the subject disclosure, namely FIGS. 1-12. More particularly, FIG. 1 depicts an article processing line wherein layout/metering operations are conducted in advance of packaging; FIGS. 2-6 depict an article selection system of/for an article processing line; FIG. 7 depicts an interface assembly or system for an article selector in furtherance of selective association/disassociation of the article selector to/with an article conveyor or transmission element (e.g., a belt, a chain, a cable, etc.), more generally, to/with a driven loop element of an article conveyor; FIGS. 8-11 depict an advantageous, non-limiting article selection system of/for the article processing line of FIG. 1; and, FIG. 12 depicts an interface assembly or system for an article selector of the station of FIG. 9 in furtherance of selective association or disassociation, e.g., engagement or disengagement, of the article selector to/with the article conveyor of the article processing line of FIG. 1.

Figure 2:
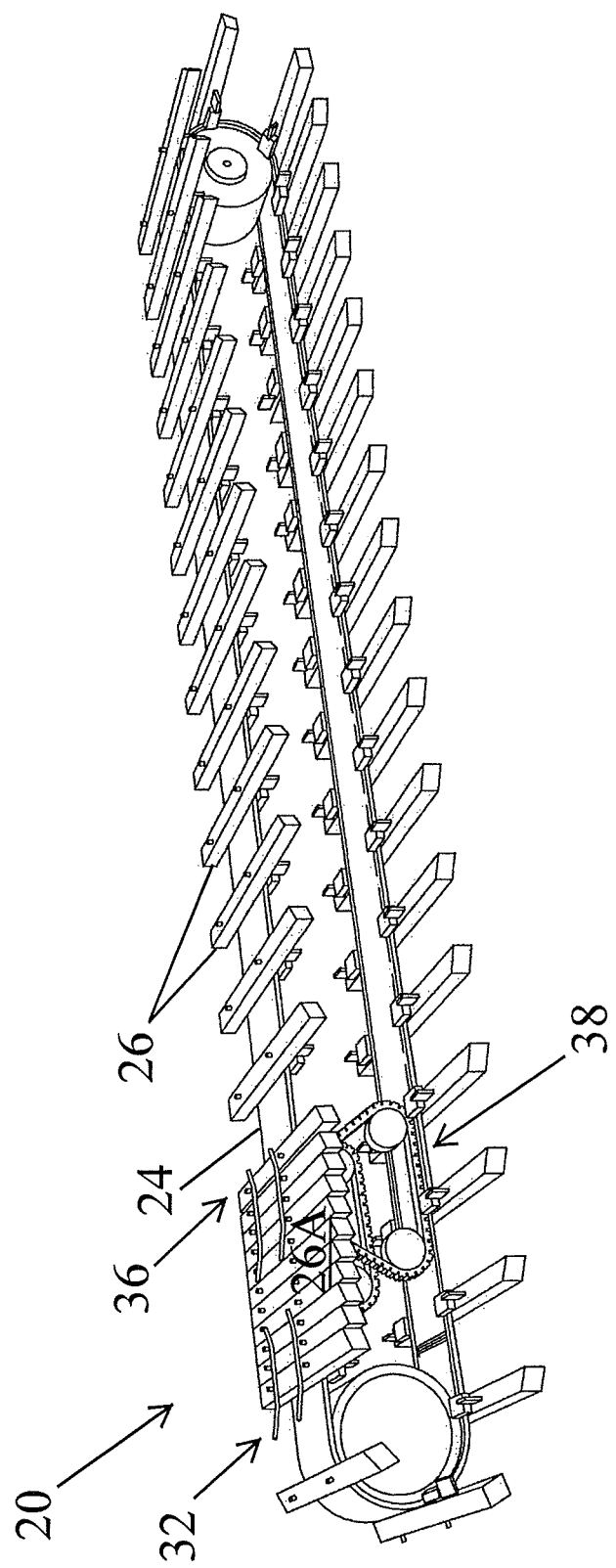
FIG. 2 depicts an article selection system of/for an article processing line.

An advantageous non-limiting article selector system, i.e., a system for spacing/spacing apart conveyed articles, is contemplated and generally shown in FIG. 2 of FIGS. 2-6, namely, an article selector or selector/grouping system 20 for selectively forming article subsets from an infeed or the like of articles, for example, article arrays such as 2×4 beverage "eight packs," 3×4 or 2×6 beverage "twelve packs," etc., in advance of the packaging of same. Notionally, the system sets or otherwise establishes a dimension of the dimensions of the article array, namely, a dimension characterized by a select number of articles. The system is characterized by an apparatus for conveying articles 22 characterized by a driven loop element 24, e.g., a transmission element such as a belt/endless belt as shown, a plurality of article selectors, e.g., selector bars 26 as shown, adapted for actuatable, reversible engagement with belt 24, and a queuing station 28 characterized by a mechanism, e.g., a first actuator 30, for disengaging, e.g., releasing, article selectors from the belt at a station ingress area 32, a mechanism, e.g., second actuator 34, to facilitate engagement, e.g., union of article selectors to/with the belt at a station egress area 36, and an assembly, e.g., queue or queuing manager 38 characterized by a metering device 40 and an article selector conveyor 42, for selectively dispensing article selectors from the queuing station.

Via provisions of dynamic cue stacking, i.e., providing a supply of article selectors or article conveying members which may be selectively and reversibly linked on-the-fly to an article conveyance element in furtherance of varying an article pitch/establishing an alternate article pitch, the functional objective of eliminating any manual change-out of one set of article selector for another to facilitate article selection, and chain manipulation to alter a pocket dimension between adjacent article selectors (i.e., providing fully automated selectively indexable article selectors from a supply of article selectors for reversible union with an article conveyor so as to quickly modify system pitch and thus a pocket dimension for/between adjacent or successive article selectors) is realized. In addition to such system and process, particulars of a reliable and durable interface, mechanical or otherwise, for and between the article conveying members and the driven loop element of the apparatus/system for conveying articles are noteworthy, namely, an assembly or system readily carried by or integral to an article selector, and a complementary element or assembly of the queuing station which alters an associated/disassociated condition for the article selector in relation to the driven loop element of the article conveyor.

Figure 3:
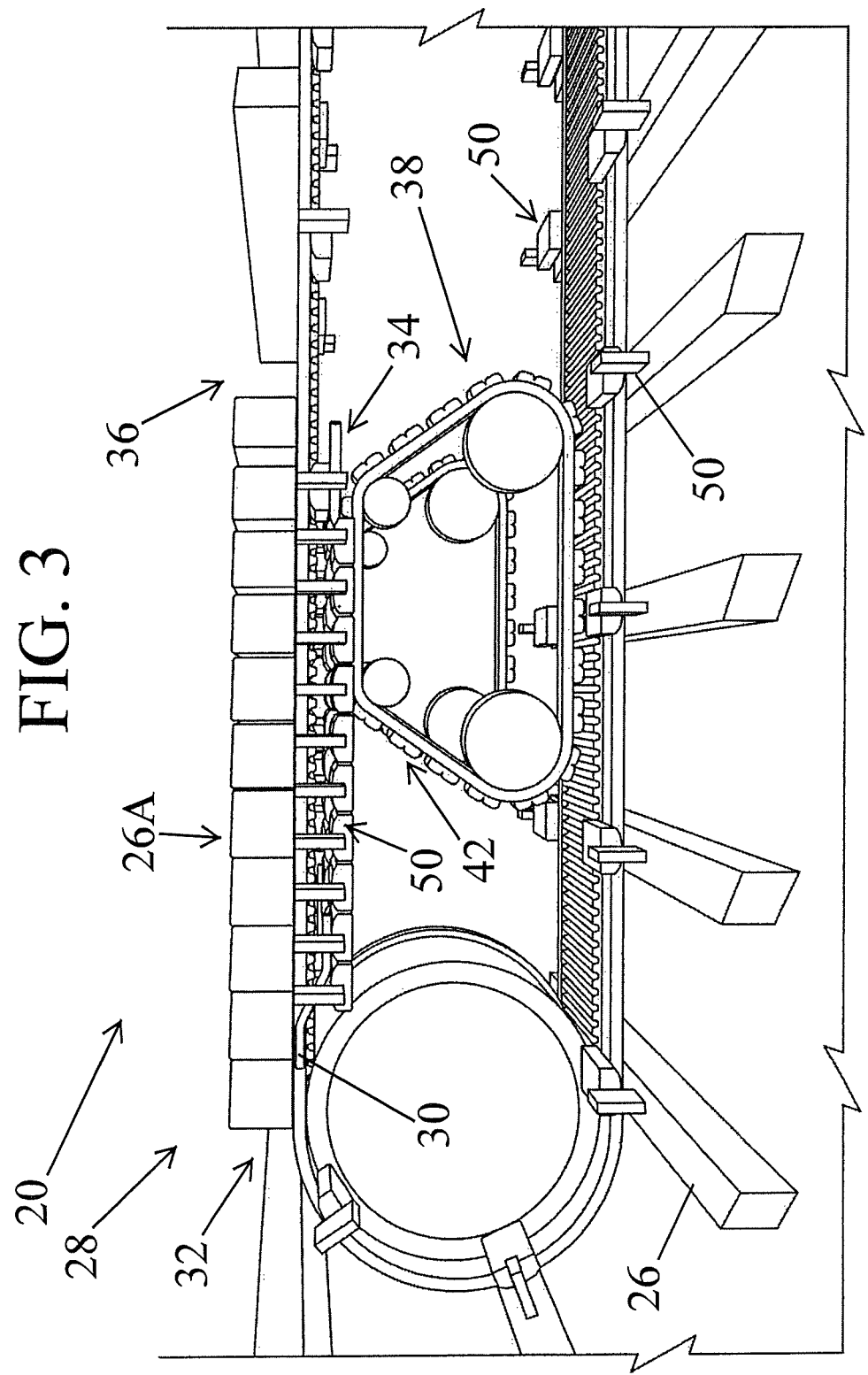
FIG. 3 depicts the queuing station of the system of FIG. 2.
Figure 4:
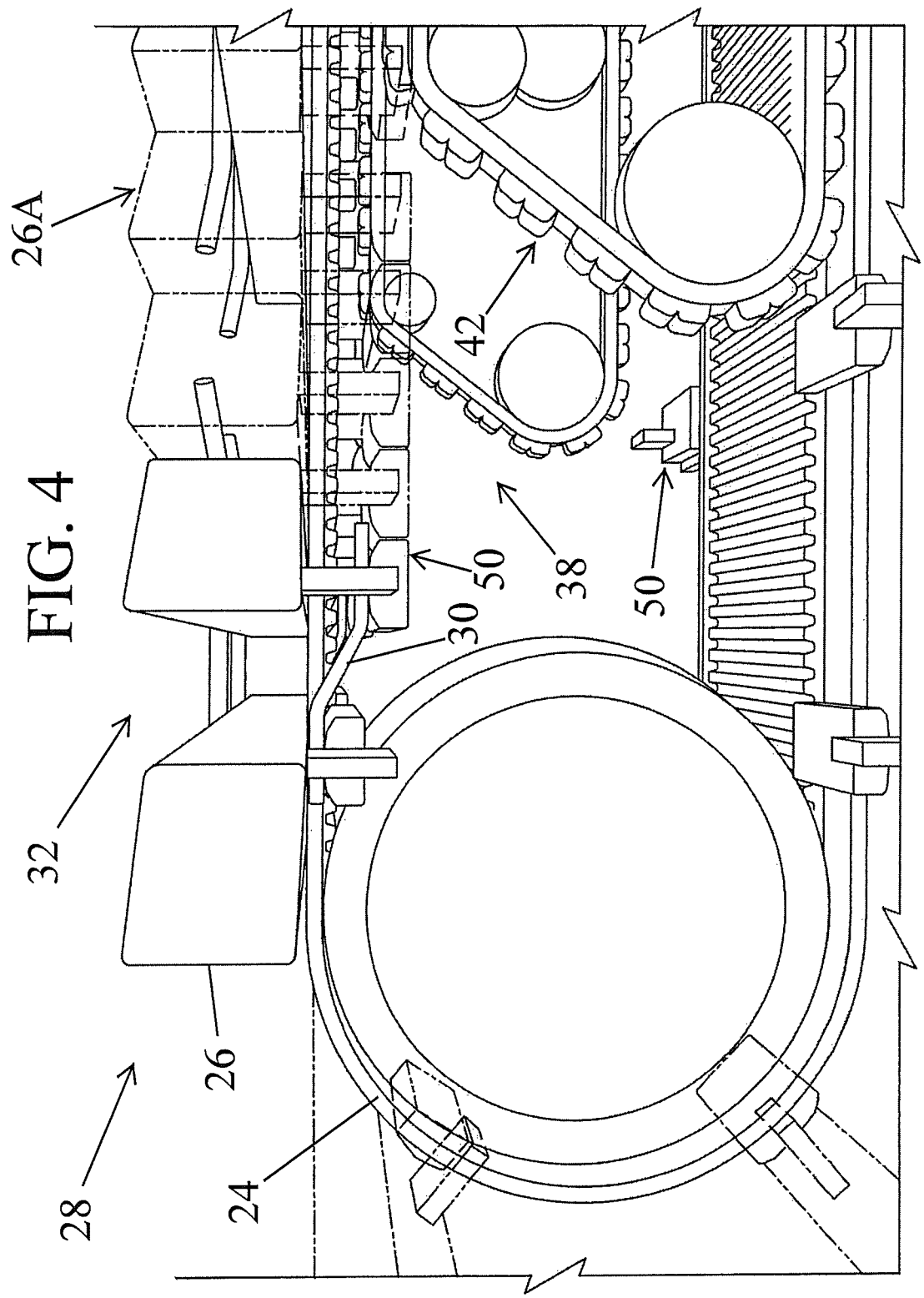
FIG. 4 depicts the queuing station ingress of the queuing station of FIG. 3.
Figure 5:
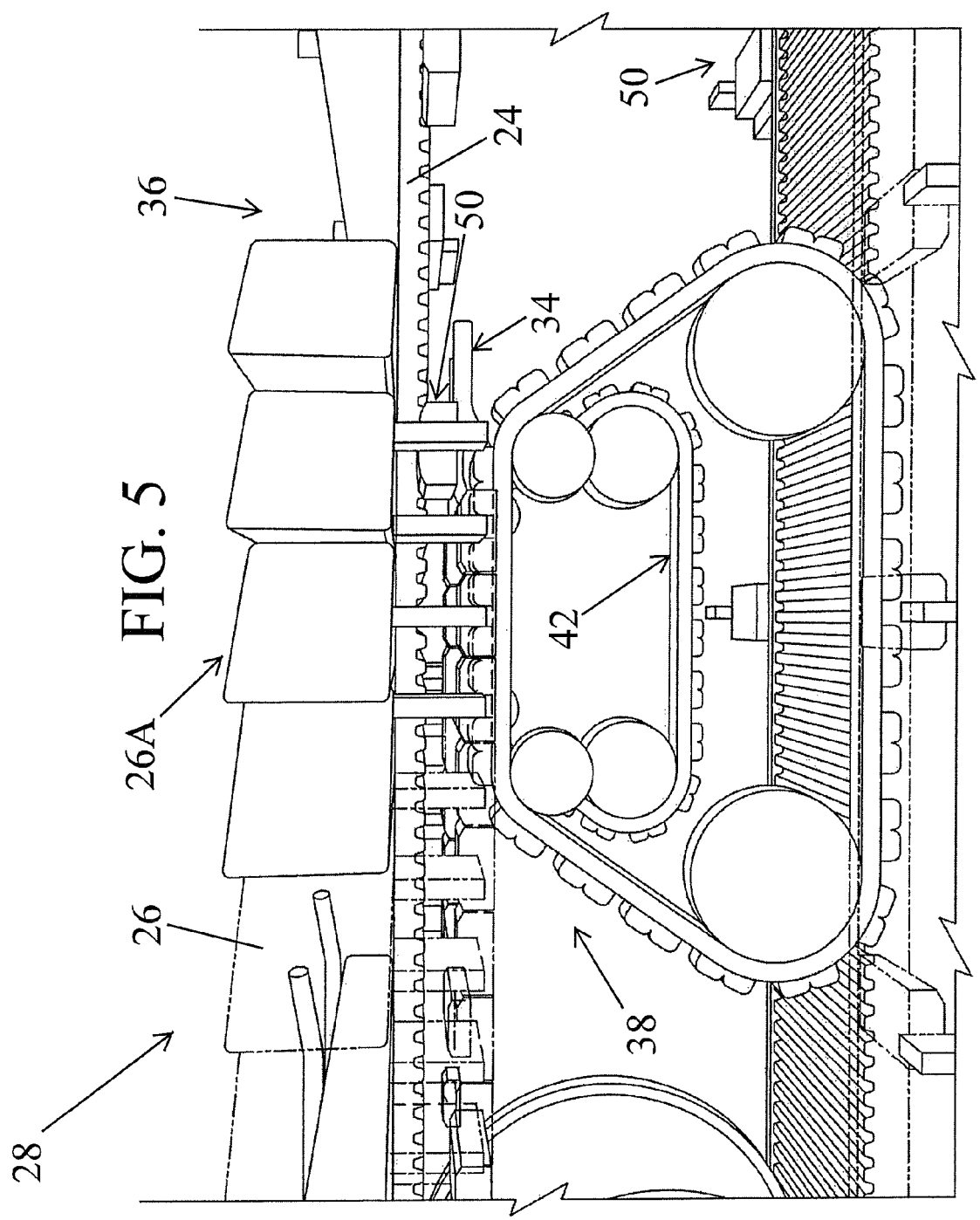
FIG. 5 depicts the queuing station egress of the queuing station of FIG. 3.
Figure 6:
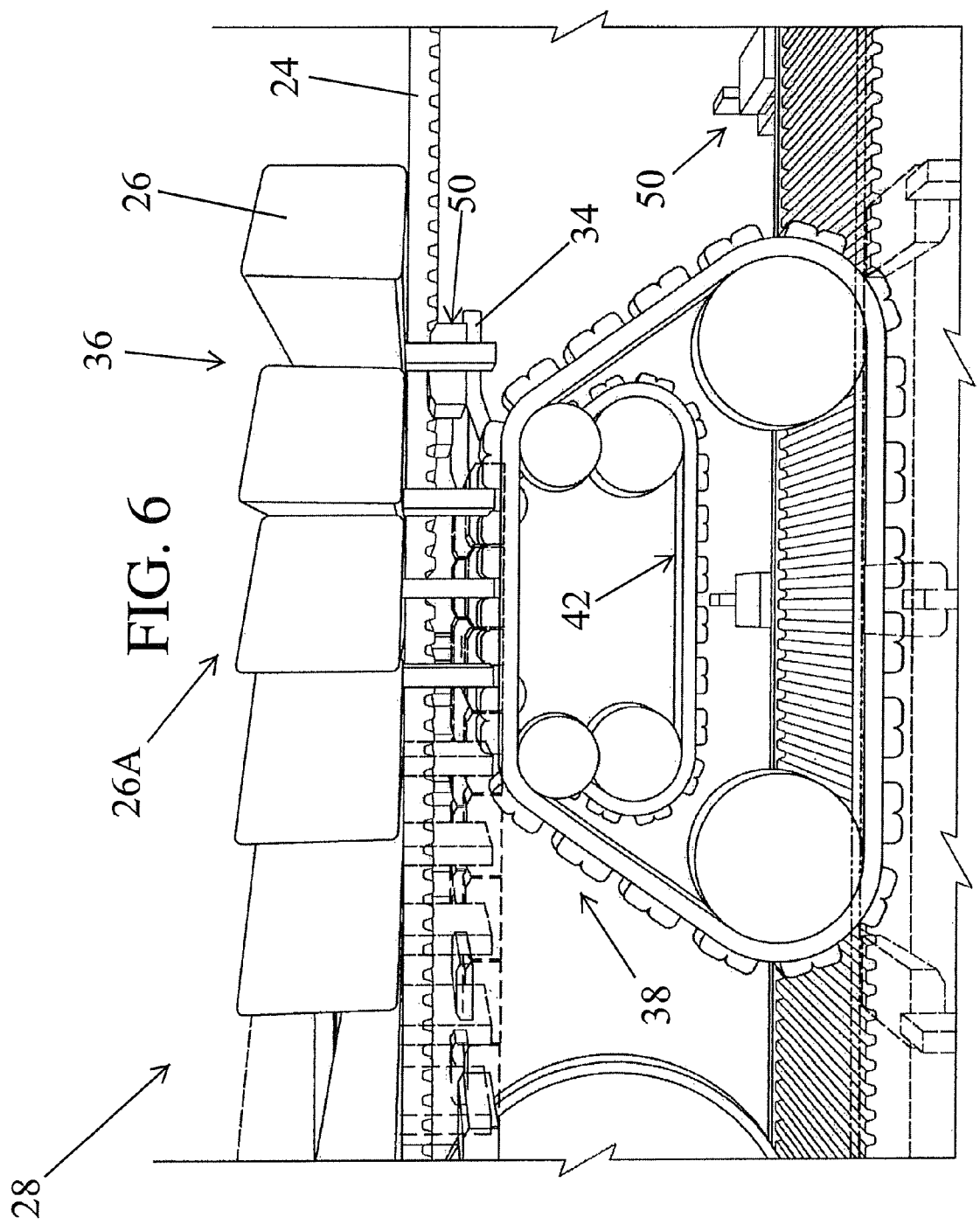
FIG. 6 depicts the queuing station egress of FIG. 5 at a later time, an article selector being advanced from the queuing station.

With general reference to FIGS. 2-6, queued article selectors 26A, disassociated from article transmission/conveyor belt 24 are shown at queuing station 28, and engaged, e.g., attached, selectors 26 are shown exterior of the station (FIGS. 2 & 3). The selectors are characterized by, e.g., equipped, with a an interface assembly 50, e.g., a clamp/clamp assembly as depicted, so as to be affixable to belt 24 (e.g., FIG. 3). Ingress portion 32 of station 28 includes disassociation means which cooperates with clamp assembly 50, or elements thereof, so as to alter the clamping/clamped condition (i.e., clamp "off") for the article selector (FIG. 4). Contrariwise, egress portion 36 of station 28 includes association means which cooperates with clamp assembly 50, or elements thereof, so as to again alter the clamping condition (i.e., clamp "on") for the article selector (FIG. 5).

The queue or queuing manager 38, in the form of an assembly characterized by metering device 40 and article selector conveyor 42 characterized by spaced apart drive assemblies 44, 46 through which article selectors pass, is provided so as to dispense disassociated article selectors 26A from a queue of queuing station 28 to egress portion 36 thereof in furtherance of establishing a select pitch for the selector bars relative to the belt. Via a servo-drive, the assembly may be precisely controlled, e.g., indexed, with such precision eliminating article displacement issues associated with the imposition of the selector bar between articles.

With reference to FIG. 7, an advantageous, non-limiting interface assembly, namely, clamping system 51 of over-center camming design is shown. Generally, article selectors 26 are equipped with or otherwise adapted to include/carry a pair of actuatable belt guides 53, each characterized by a belt capturing end 55 and displaceable free end 57. The spacing between belt capturing ends 55 is generally equivalent to a width for the belt. Belt 24 generally includes a tread (i.e., toothed or geared) portion 59 intermediate opposing peripheral segments 61 thereof. A resilient member 63, in the form of a spring or the like, is operatively interposed between system elements so as to tension the displaceable free ends 57 of belt guides 53 such that belt capturing ends 55 form an interference fit with the peripheral segments 61 of belt 24 and thereby effectuate union of the article selector with the belt. With or upon entry of an article selector to ingress portion 32 of selector queuing station 28, a center camming means 65 engages the displaceable free ends 36 of the actuatable belt guides 32 so as to overcome the tension, thereby releasing the article selector for queuing within the queuing station.

Referring now to FIGS. 1, & 8-11, there is depicted a further system 20' (FIGS. 1 & 8) for spacing conveyed articles, e.g., for spacing conveyed articles of the article processing line of FIG. 1. The system may be fairly characterized by a driven loop element 24, e.g., a transmission or conveyor belt as shown, a plurality of article selectors 26, each article selector of the plurality of article selectors adapted for select reversible engagement with the belt. Moreover, a queuing station 28 characterized by a mechanism, e.g., a first actuator 30, for disengaging, e.g., releasing, article selectors from the belt at a station ingress area 32, a mechanism, e.g., second actuator 34, to facilitate engagement, e.g., union of article selectors to/with the belt at a station egress area 36 is advantageously provided. Further still, an assembly, e.g., queue or queuing manager 38 characterized by a metering device 40 having shaft driven metering wheels 70 as shown, and an article selector conveyor 42 having spaced apart drive assemblies 44, 46, each characterized by sets of metering belts 47 as shown, for selectively dispensing articles from the queuing station is likewise advantageously provided. Although not shown, an advancing conveyor, e.g., a snap-on chain conveyor or the like, for conveying disengaged article selectors from the queuing station ingress or ingress local towards the egress portion or local thereof and maintaining a surge pressure upon article selectors in queue subsequent to metering and dispensing via an assembly or apparatuses for executing same is contemplated.

Figure 9:
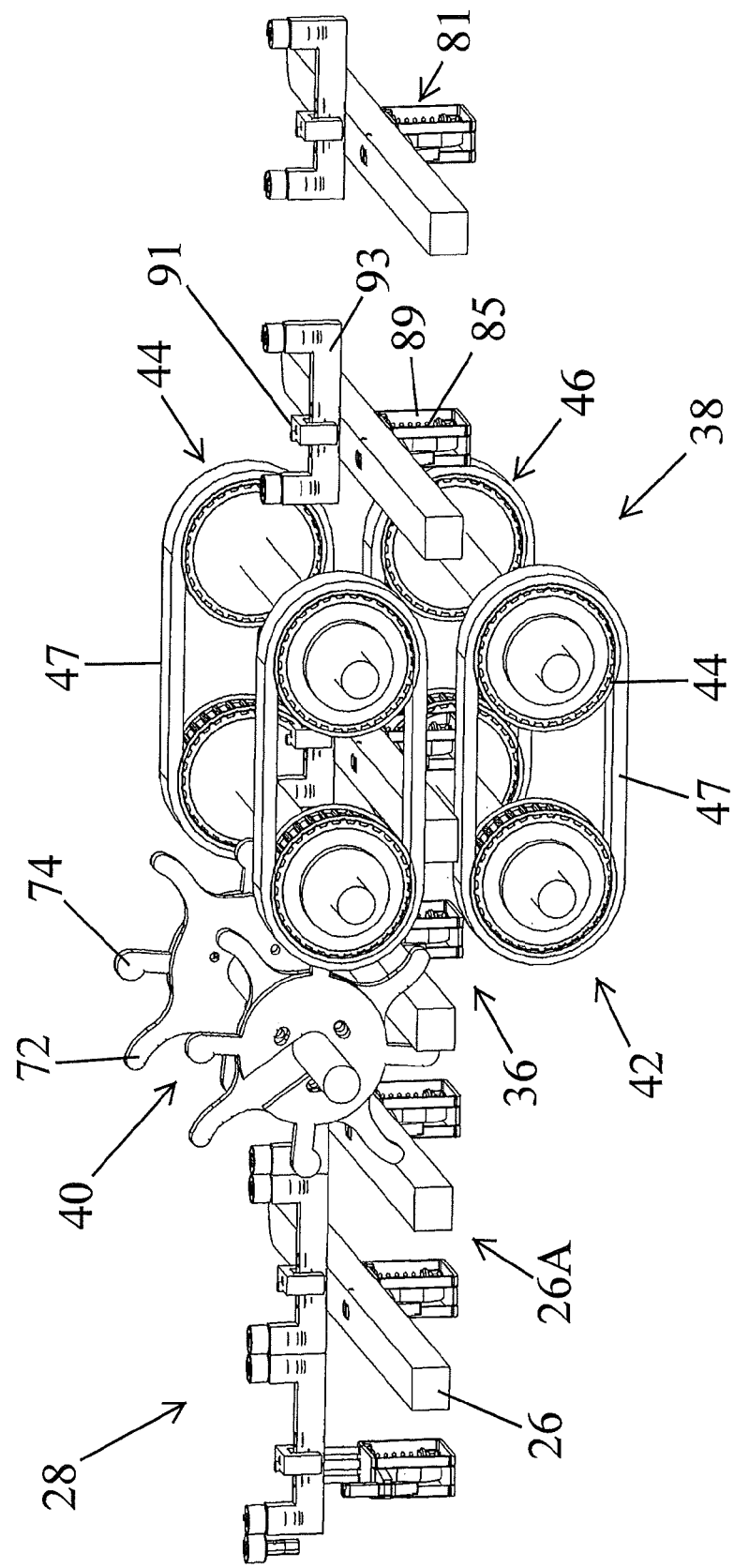
FIG. 9 depicts a queuing station of the processing line of FIG. 8, elements removed for the sake of clarity.

As is readily appreciated with reference to FIG. 9, a leading article selector from the queue is advanced via the article selector conveyor so as to engage a stay, in the form of finger 72, of metering wheel 70, thereafter, a carrier, in the form of lobed finger 74, of metering wheel 70, guides the leading article selector toward/to the egress local of the queuing station whereupon actuation of an interface assembly for and between the article selector and the belt is realized, e.g., as by cooperative engagement of a latch of a latch assembly with a plow (as will be later discussed in connection to at least FIG. 12), in furtherance of establishing an operative engagement for the selector in relation to the belt.

In advance of the establishment of the operative engagement condition, the article selector is selectively advanced by and between metering paired belts 47, advantageously but not necessarily, two sets (i.e., a spaced apart upper set and a spaced apart lower set, the upper and lower sets in registration) as depicted. Metering wheel 70 utilizes a cam motion based on the feedback from a belt drive servo encoder to advance the article selector so as to match the article belt speed at the point where the latch of the latching mechanism is engaged. The location of the article selector down stream of egress local is readily tracked utilizing the encoder of the article belt drive servo, with this information used to time the release, i.e., establish the article pitch, of the subsequent selector by the metering wheel.

As should be appreciated in connection to FIG. 1, the article selectors, once in operative engagement with the belt or other loop element, travel therewith around a tail shaft pulley of the article conveying apparatus and generally establish article pockets delimited by adjacent or successive article selectors. Downstream the article selectors intersect or more generally interact with a supply of articles in their respective infeed lanes where the article selector parts the article stream, thereby metering the articles into a select group "length." Thereafter, the article selectors direct the metered/arrayed articles to a cartoner, usually with the use of angled product infeed rails and a seating wheel. The article selectors advance toward the queuing station via travel around a head shaft pulley of the article conveying apparatus and to and through the ingress portion or local of the station.

At ingress local, a further actuation of the interface assembly for and between the selector and the article conveyor is realized in furtherance of article selector disengagement, as by a cooperative engagement of a tongue of the lever of the latch assembly via a plow so as to engage the previously unlatched latch, in furtherance of establishing an operative disengagement for the selector in relation to the belt. The article selector now rests once again on the advancing conveyor which more or less defines or delimits the selector bar queue.

As is readily appreciated with reference to FIGS. 10-12 of FIGS. 8-12, each article selector 26 of the plurality of selectors advantageously include an interface assembly, more particularly, latch assembly 81 as shown. Latch assembly 81 generally includes a center bolt/shaft 83, a spring 85, a lever 87, a lever mount 89, a tooth or plate 91, a guide plate or spacer 93 and a lever latch 95 (FIGS. 11 & 12). Guide plate 93 generally establishes a spaced apart condition for, between and among the queued selectors (see e.g., FIG. 10).

As shown in FIG. 12, with lever 87, more particularly, free end of a tongue thereof, in latched engagement with latch 95, tooth 91 is in a spaced apart condition relative to the article selector such that the belt freely passes between the tooth and the article selector. A plow (not shown), in the form of a rotating disc, for example, at egress local 36 disengages latch 95 from lever 87 such that spring 85 tensioningly operates upon the tooth so as to secure the article selector to the article belt. Moreover, a further plow (not shown), in the form of a rotating disc, for example, at ingress local 32 engages lever 87 for engagement with latch 95 such that the tension of spring 85 is overcome and the clamp tooth 91 is thereby operative disengaged or disassociated from the article belt.

Notionally, a supply of article selectors is provided, in the form of a queue of article selectors, adapted for reversible, automatic union with a driven loop element of an article conveyor, as by reversible self-clamping or self-latching. Selective indexing of the article selectors from the supply of article selectors permits system pitch, and thus a pocket dimension between adjacent or successive selectors, to be easily and reliably altered on-the-fly. As to heretofore described and depicted article related operations, it should be appreciated that such operations, systems, devices, etc. could apply or be utilized in connection to, among other things, round articles or products, pouches in buckets, adjustable flights on case packers, adjustable article buckets, cartoning, and continuous motion case packers. Moreover, the disclosed elements/structures could be used as a metering system, or as part of the flights.

The outlined approach is an improvement of heretofore known article selector stations wherein a manual change-out of one set of selectors for another is required to establish article selection, and wherein manipulation of a chain of a pair of chains which carry alternating article selector groups, so as to alter the spacing of a first group of article selectors in relation to a second group of article selectors so as to thereby change a pocket dimension between adjacent selectors, is likewise required. Finally, it is to be noted that additional applications for the technology of the instant disclosure include, but are not limited to, mechanical toggle locks, spring clamps, solenoid, magnetic, air cylinders, friction belts, etc.

While advantageous, non-limiting systems, apparatus, devices, mechanisms, methods, etc. relating to spacing of conveyed articles are depicted, described and/or readily ascertained with reference to the instant disclosure, alternate not insubstantial functional equivalents are likewise contemplated to effectuate a sought after on-the-fly pitch variation for conveyed articles. Presently known and future developed means for effectuating the noted functionalities are understood to be within the scope of the instant disclosure.

Thus, since the structures of the assemblies/mechanisms disclosed herein may be embodied in other specific forms without departing from the spirit or general characteristics thereof, some of which forms have been indicated, the embodiments described and depicted herein/with are to be considered in all respects illustrative and not restrictive. Accordingly, the scope of the subject invention is as defined in the language of the appended claims, and includes not insubstantial equivalents thereto.

That which is claimed:

1. A system for spacing conveyed articles, the system comprising:
   a. an apparatus for conveying articles characterized by a driven loop element;
   b. a plurality of article selectors, each article selector of said plurality of article selectors adapted for select reversible engagement with said driven loop element, said select reversible engagement comprising electro-mechanical engagement;
   c. a queuing station characterized by an ingress portion and an egress portion wherein article selectors are retained for select dispensing in furtherance of driven loop element engagement, said queuing station comprising a first actuator to facilitate disengagement of article selectors of said plurality of article selectors from said driven loop element at said ingress portion, and a second actuator to facilitate engagement of article selectors of said plurality of article selectors with said driven loop element at said egress portion; and,
   d. an assembly for selectively dispensing article selectors from said queuing station.

2. The system of claim 1 wherein said assembly for selectively dispensing article selectors comprises an article selector conveyor.

3. The system of claim 1 wherein said assembly for selectively dispensing article selectors comprises a metering device and an article selector conveyor, said metering device selectively passing article selectors to said article selector conveyor in furtherance of dispensing same.

4. The system of claim 1 wherein said assembly for selectively dispensing article selectors comprises an article selector conveyer characterized by spaced apart drive assemblies through which said article selectors pass.

5. The system of claim 1 wherein said assembly for selectively dispensing article selectors is controllingly linked with a drive of said driven loop element.

6. A system for spacing conveyed articles, the system comprising:
   a. an apparatus for conveying articles characterized by a driven loop element;
   b. a plurality of article selectors, each article selector of said plurality of article selectors adapted for select reversible engagement with said driven loop element, said select reversible engagement comprising magnetic engagement;
   c. a queuing station characterized by an ingress portion and an egress portion wherein article selectors are retained for select dispensing in furtherance of driven loop element engagement, said queuing station comprising a first actuator to facilitate disengagement of article selectors of said plurality of article selectors from said driven loop element at said ingress portion, and a second actuator to facilitate engagement of article selectors of said plurality of article selectors with said driven loop element at said egress portion; and,
   d. an assembly for selectively dispensing article selectors from said queuing station.

7. The system of claim 6 wherein said assembly for selectively dispensing article selectors comprises an article selector conveyor.

8. The system of claim 6 wherein said assembly for selectively dispensing article selectors comprises a metering device and an article selector conveyor, said metering device selectively passing article selectors to said article selector conveyor in furtherance of dispensing same.

9. The system of claim 6 wherein said assembly for selectively dispensing article selectors comprises an article selector conveyer characterized by spaced apart drive assemblies through which said article selectors pass.

10. The system of claim 6 wherein said assembly for selectively dispensing article selectors is controllingly linked with a drive of said driven loop element.

11. A system for spacing conveyed articles, the system comprising:
   a. an apparatus for conveying articles characterized by a driven loop element;
   b. a plurality of article selectors, each article selector of said plurality of article selectors adapted for select reversible engagement with said driven loop element;
   c. a queuing station characterized by an ingress portion and an egress portion wherein article selectors are retained for select dispensing in furtherance of driven loop element engagement, said queuing station comprising a first actuator to facilitate disengagement of article selectors of said plurality of article selectors from said driven loop element at said ingress portion, and a second actuator to facilitate engagement of article selectors of said plurality of article selectors with said driven loop element at said egress portion; and,
   d. an assembly for selectively dispensing article selectors from said queuing station, wherein, in advance of second actuator actuation, an article selector for engagement with said driven loop element is synchronously driven by said assembly for selectively dispensing article selectors such that a speed for said article selector substantially matches a speed for said driven loop element.

12. A system for spacing conveyed articles, the system comprising:
   a. an apparatus for conveying articles characterized by a driven loop element;
   b. a plurality of article selectors, each article selector of said plurality of article selectors adapted for select reversible engagement with said driven loop element, said each article selector of said plurality of article selectors characterized by an interface assembly actuatable by said first actuator and said second actuator of said queuing station;
   c. a queuing station characterized by an ingress portion and an egress portion wherein article selectors are retained for select dispensing in furtherance of driven loop element engagement, said queuing station comprising a first actuator to facilitate disengagement of article selectors of said plurality of article selectors from said driven loop element at said ingress portion, and a second actuator to facilitate engagement of article selectors of said plurality of article selectors with said driven loop element at said egress portion; and,
   d. an assembly for selectively dispensing article selectors from said queuing station.

13. A system for spacing conveyed articles, the system comprising:
   a. an apparatus for conveying articles characterized by a driven loop element;
   b. a plurality of article selectors, each article selector of said plurality of article selectors adapted for select reversible engagement with said driven loop element;
   c. a queuing station characterized by an ingress portion and an egress portion wherein article selectors are retained for select dispensing in furtherance of driven loop element engagement, said queuing station comprising a first actuator to facilitate disengagement of article selectors of said plurality of article selectors from said driven loop element at said ingress portion, and a second actuator to facilitate engagement of article selectors of said plurality of article selectors with said driven loop element at said egress portion, said each article selector of said plurality of article selectors equipped with an interface assembly actuatable by said first actuator and said second actuator of said queuing station; and,
   d. an assembly for selectively dispensing article selectors from said queuing station.

14. A system for spacing conveyed articles, the system comprising:
   a. an apparatus for conveying articles characterized by a driven loop element;
   b. a plurality of article selectors, each article selector of said plurality of article selectors adapted for select reversible engagement with said driven loop element;
   c. a queuing station characterized by an ingress portion and an egress portion wherein article selectors are retained for select dispensing in furtherance of driven loop element engagement, said queuing station comprising a first actuator to facilitate disengagement of article selectors of said plurality of article selectors from said driven loop element at said ingress portion, and a second actuator to facilitate engagement of article selectors of said plurality of article selectors with said driven loop element at said egress portion, said each article selector of said plurality of article selectors characterized by a clamping assembly actuatable by said first actuator and said second actuator of said queuing station; and,
   d. an assembly for selectively dispensing article selectors from said queuing station.

15. A system for spacing conveyed articles, the system comprising:
   a. an apparatus for conveying articles characterized by a driven loop element;
   b. a plurality of article selectors, each article selector of said plurality of article selectors adapted for select reversible engagement with said driven loop element;
   c. a queuing station characterized by an ingress portion and an egress portion wherein article selectors are retained for select dispensing in furtherance of driven loop element engagement, said queuing station comprising a first actuator to facilitate disengagement of article selectors of said plurality of article selectors from said driven loop element at said ingress portion, and a second actuator to facilitate engagement of article selectors of said plurality of article selectors with said driven loop element at said egress portion, said each article selector of said plurality of article selectors characterized by a latching assembly actuatable by said first actuator and said second actuator of said queuing station; and,
   d. an assembly for selectively dispensing article selectors from said queuing station.

16. A system for spacing conveyed articles, the system comprising:
   a. an apparatus for conveying articles characterized by a driven loop element;
   b. a plurality of article selectors, each article selector of said plurality of article selectors adapted for select reversible engagement with said driven loop element;
   c. a queuing station characterized by an ingress portion and an egress portion wherein article selectors are retained for select dispensing in furtherance of driven loop element engagement, said queuing station comprising a first actuator to facilitate disengagement of article selectors of said plurality of article selectors from said driven loop element at said ingress portion, and a second actuator to facilitate engagement of article selectors of said plurality of article selectors with said driven loop element at said egress portion; and,
   d. an assembly for selectively dispensing article selectors from said queuing station, said assembly for selectively dispensing article selectors comprising a metering device and an article selector conveyor, said metering device selectively passing an article selector to said article selector conveyor based upon a position of a previously dispensed article selector.

* * * * *